US012362513B2

(12) United States Patent
Kosaka

(10) Patent No.: US 12,362,513 B2
(45) Date of Patent: Jul. 15, 2025

(54) CONNECTOR

(71) Applicant: SUMITOMO WIRING SYSTEMS, LTD., Mie (JP)

(72) Inventor: Ryotaro Kosaka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 360 days.

(21) Appl. No.: 17/801,995

(22) PCT Filed: Feb. 8, 2021

(86) PCT No.: PCT/JP2021/004480

§ 371 (c)(1),
(2) Date: Aug. 24, 2022

(87) PCT Pub. No.: WO2021/171977

PCT Pub. Date: Sep. 2, 2021

(65) Prior Publication Data

US 2023/0090903 A1 Mar. 23, 2023

(30) Foreign Application Priority Data

Feb. 28, 2020 (JP) ................................ 2020-032893

(51) Int. Cl.
*H01R 13/436* (2006.01)
*H01R 43/26* (2006.01)

(52) U.S. Cl.
CPC ......... *H01R 13/4365* (2013.01); *H01R 43/26* (2013.01)

(58) Field of Classification Search
CPC . H01R 13/4365; H01R 13/4364; H01R 43/26
(Continued)

(56) References Cited

U.S. PATENT DOCUMENTS 4,973,268 A * 11/1990 Smith .................. H01R 13/443 439/948
5,944,558 A 8/1999 Iwahori
(Continued)

FOREIGN PATENT DOCUMENTS

JP H07-282884 A 10/1995
JP 2013-218902 A 10/2013
JP 2016-081832 A 5/2016

OTHER PUBLICATIONS

International Search Report issued on Apr. 6, 2021 for WO 2021/171977 A1 (4 pages).

*Primary Examiner* — Gary F Paumen
(74) *Attorney, Agent, or Firm* — Venjuris, P.C.

(57) ABSTRACT

A housing (10) includes a plurality of cavities (14), a first lock receiving portion (21) arranged to correspond to one cavity (14) and a second lock receiving portion (22) arranged to correspond to another cavity (14). A retainer (60) is arranged in the housing (10) to restrict terminal fittings (50) from coming out from the cavities (14). The retainer (60) includes a deflectable and deformable deflecting piece (71). The deflecting piece (71) includes a first locking portion (73) for locking the first lock receiving portion (21), a second locking portion (74) for locking the second lock receiving portion (22) and a slit (72) arranged between the first locking portion (73) and the second locking portion (74). The slit (72) is open in a separating direction of the retainer (60) from the housing (10).

4 Claims, 9 Drawing Sheets

(58) Field of Classification Search
USPC .................................................. 439/660, 752
See application file for complete search history.

(56) References Cited

U.S. PATENT DOCUMENTS

| | | | | |
|---|---|---|---|---|
| 6,416,344 | B2 * | 7/2002 | Okayasu ............ | H01R 13/4365 439/352 |
| 2002/0016106 | A1 | 2/2002 | Okayasu et al. | |

* cited by examiner

CONNECTOR

CROSS REFERENCE TO RELATED APPLICATIONS

This application is a national phase of PCT application No. PCT/JP2021/004480, filed on 8 Feb. 2021, which claims priority from Japanese patent application No. 2020-032893, filed on 28 Feb. 2020, all of which are incorporated herein by reference.

TECHNICAL FIELD

The present disclosure relates to a connector.

BACKGROUND

A connector disclosed in Patent Document 1 includes a housing, terminals and a front holder (hereinafter, referred to as a retainer). The housing includes a plurality of terminal accommodation chambers for accommodating the terminals. The retainer is arranged movably to a partial locking position and a full locking position with respect to the housing. The retainer includes a partial locking arm for locking a partial locking portion of the housing at the partial locking position and a full locking arm for locking a full locking portion of the housing at the full locking position. The retainer includes a disengaging projection on a tip side in a length direction of the full locking arm. The housing includes a rib having an L-shaped cross-section at a position corresponding to the disengaging projection. In removing the retainer, a tip part of a releasing jig is guided by the rib and hooked to the disengaging projection. In that state, the releasing jig is pulled out and the retainer is moved from the full locking position to the partial locking position. Note that a configuration in which a retainer is arranged movably between a partial locking position and a full locking position with respect to a housing is also disclosed in Patent Document 2.

PRIOR ART DOCUMENT

Patent Document

Patent Document 1: JP H10-308249 A
Patent Document 2: JP 2016-081832 A

SUMMARY OF THE INVENTION

Problems to be Solved

In Patent Document 1, the rib for guiding the releasing jig and the disengaging projection to be engaged with the releasing jig are respectively formed by specially processing the housing and the retainer. Thus, there has been a problem that the structures of the housing and the retainer are complicated.

Accordingly, the present disclosure aims to provide a connector enabling an unlocking operation of a retainer without complicating a structure.

Means to Solve the Problem

The present disclosure is directed to a connector with a housing, terminal fittings and a retainer, wherein the housing includes a plurality of cavities, a first lock receiving portion arranged to correspond to one cavity and a second lock receiving portion arranged to correspond to another cavity, the terminal fittings are arranged in the cavities, the retainer is arranged in the housing to restrict the terminal fittings from coming out from the cavities and includes a deflectable and deformable deflecting piece, the deflecting piece includes a first locking portion for locking the first lock receiving portion, a second locking portion for locking the second lock receiving portion and a slit arranged between the first and second locking portions, and the slit is open in a separating direction of the retainer from the housing.

Effect of the Invention

According to the present disclosure, it is possible to provide a connector enabling an unlocking operation of a retainer without complicating a structure.

DESCRIPTION OF EMBODIMENTS OF PRESENT DISCLOSURE

Figure 1:
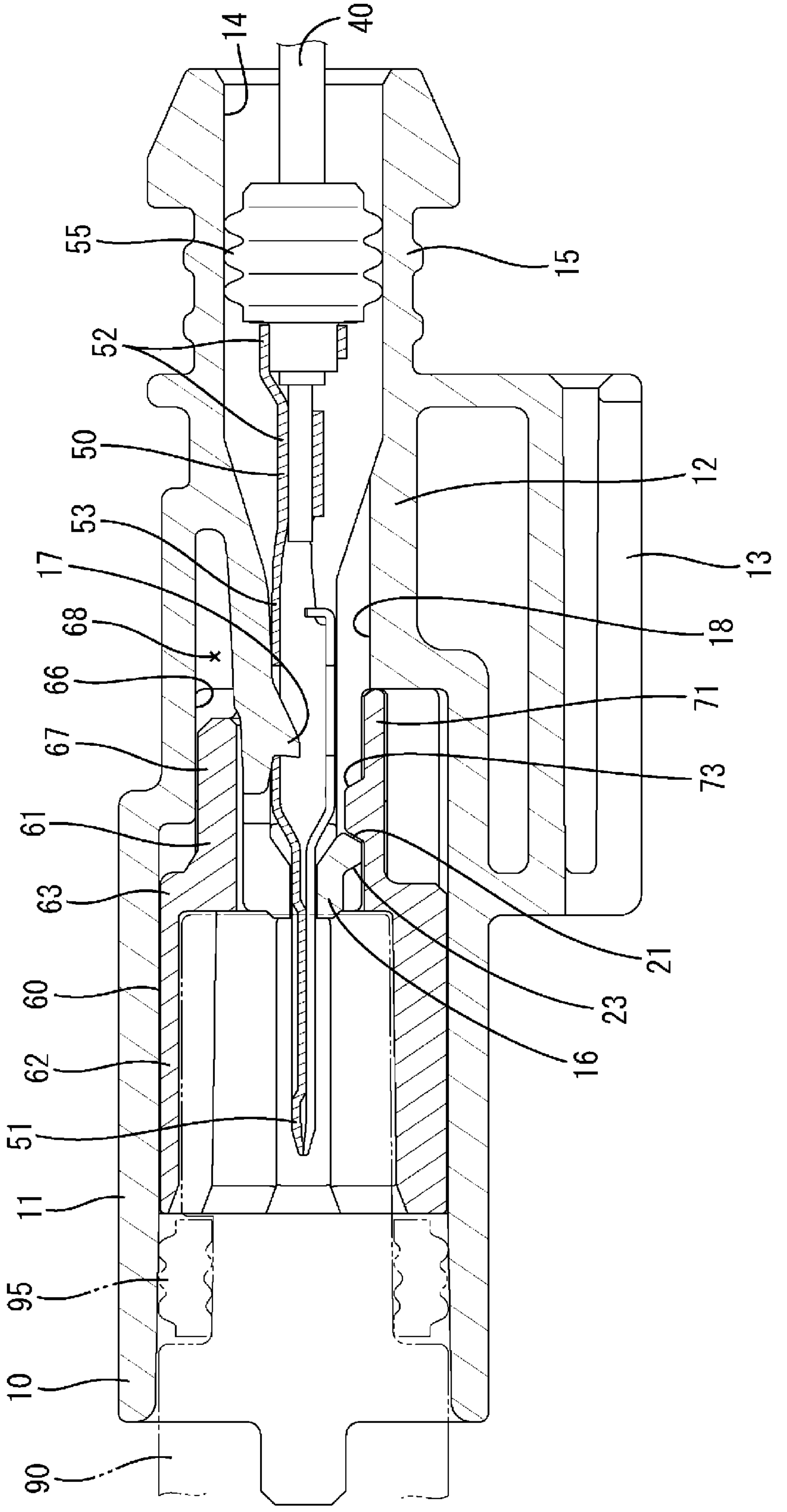
FIG. 1 is a side view in section showing a state where a retainer is held at a full locking position with respect to a housing in a connector of one embodiment.

First, embodiments of the present disclosure are listed and described.

(1) The connector of the present disclosure is provided with a housing, terminal fittings and a retainer, wherein the housing includes a plurality of cavities, a first lock receiving portion arranged to correspond to one cavity and a second lock receiving portion arranged to correspond to another cavity, the terminal fittings are arranged in the cavities, the retainer is arranged in the housing to restrict the terminal fittings from coming out from the cavities and includes a deflectable and deformable deflecting piece, the deflecting piece includes a first locking portion for locking the first lock receiving portion, a second locking portion for locking the second lock receiving portion and a slit arranged between the first and second locking portions, and the slit is open in a separating direction of the retainer from the housing. According to this configuration, in releasing locking of the first locking portion and the first lock receiving portion and locking of the second locking portion and the second lock receiving portion, a releasing operation can be performed by inserting a releasing jig into the slit from an opening. The slit divides the deflecting piece into a region including the first locking portion and a region including the second locking portion, and fulfills a function of smoothly deflecting and deforming the respective regions. Since the slit for smoothing the deflection of the deflecting piece can be used as an insertion path for the releasing jig according to the present disclosure as just described, an unlocking operation of the retainer can be performed without complicating a structure.

(2) Preferably, the retainer includes a groove continuous with the slit in the separating direction, and the groove is arranged between a pair of wall portions extending in parallel along the separating direction. According to this configuration, the releasing jig can be inserted into the groove between the pair of wall portions and the pair of wall portions can be used as a guide for guiding the releasing jig. As a result, an inserting operation of the releasing jig can be more easily and efficiently performed.

(3) The deflecting piece may include end slits on both lateral end parts across the first and second locking portions in a width direction orthogonal to the separating direction, and an opening width of the slit may be larger than those of the end slits. According to this configuration, since the region including the first locking portion and the region including the second locking portion in the deflecting piece are arranged between the end slits and the slit, the respective regions can be more smoothly deflected and deformed. Further, if the releasing jig is configured to be inserted into the slit having a large opening width, the strength of the releasing jig is easily ensured.

(4) The retainer may include a step portion at a position adjacent to the deflecting piece and the slit may penetrate from a facing surface on the side of the deflecting piece to an opposite surface of the step portion. According to this configuration, the locking of the first locking portion and the first lock receiving portion or the locking of the second locking portion and the second lock receiving portion can be released by inserting the releasing jig into the slit and turning the releasing jig and moving the releasing jig in the separating direction with a tip part of the releasing jig abutting on the facing surface of the step portion. Since the releasing jig does not contact locking structures such as the first locking portion, the first lock receiving portion, the second locking portion and the second lock receiving portion, the damage of the locking structures can be avoided. It is also possible to avoid the damage of a sealing surface of the housing by the tip of the jig.

Details of Embodiment of Present Disclosure

Embodiment

A specific example of a connector of the present disclosure is described below with reference to the drawings. Note that the present invention is not limited to these illustrations and is intended to be represented by claims and include all changes in the scope of claims and in the meaning and scope of equivalents.

Embodiment

A connector of this embodiment includes, as shown in FIG. 1, a housing 10, a plurality of terminal fittings 50 to be accommodated into the housing 10, and a retainer 60 to be mounted movably between a partial locking position and a full locking position with respect to the housing 10. The housing 10 is fit to a mating housing 90 from front (left side in FIG. 1).

Mating Housing

The mating housing 90 is made of synthetic resin and, as shown in FIG. 1, inserted into later-described receptacle 11 and fitting tube portion 62 of the housing 10. Unillustrated mating terminal fittings connectable to the terminal fittings 50 are accommodated in the mating housing 90. An annular sealing member 95 is mounted on the outer peripheral surface of the mating housing 90. When the both housings 10, 90 are connected, the sealing member 95 is sandwiched and compressed between the receptacle 11 and the mating housing 90. In this way, liquid-tight sealing is provided between the both housings 10 and 90.

Housing

Figure 5:
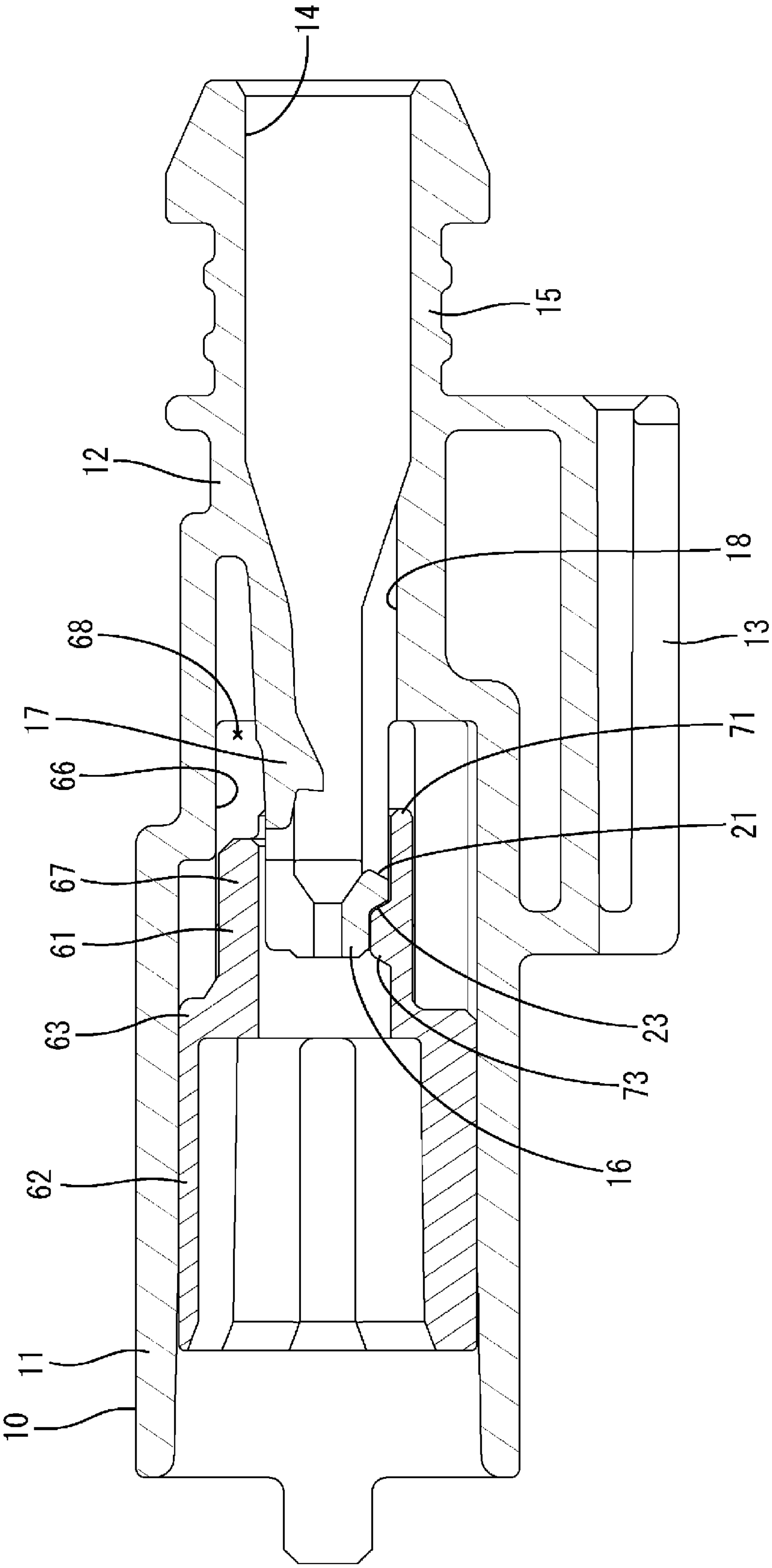
FIG. 5 is a side view in section showing a state before terminal fittings are inserted into the cavities with the retainer held at the partial locking position with respect to the housing.
Figure 6:
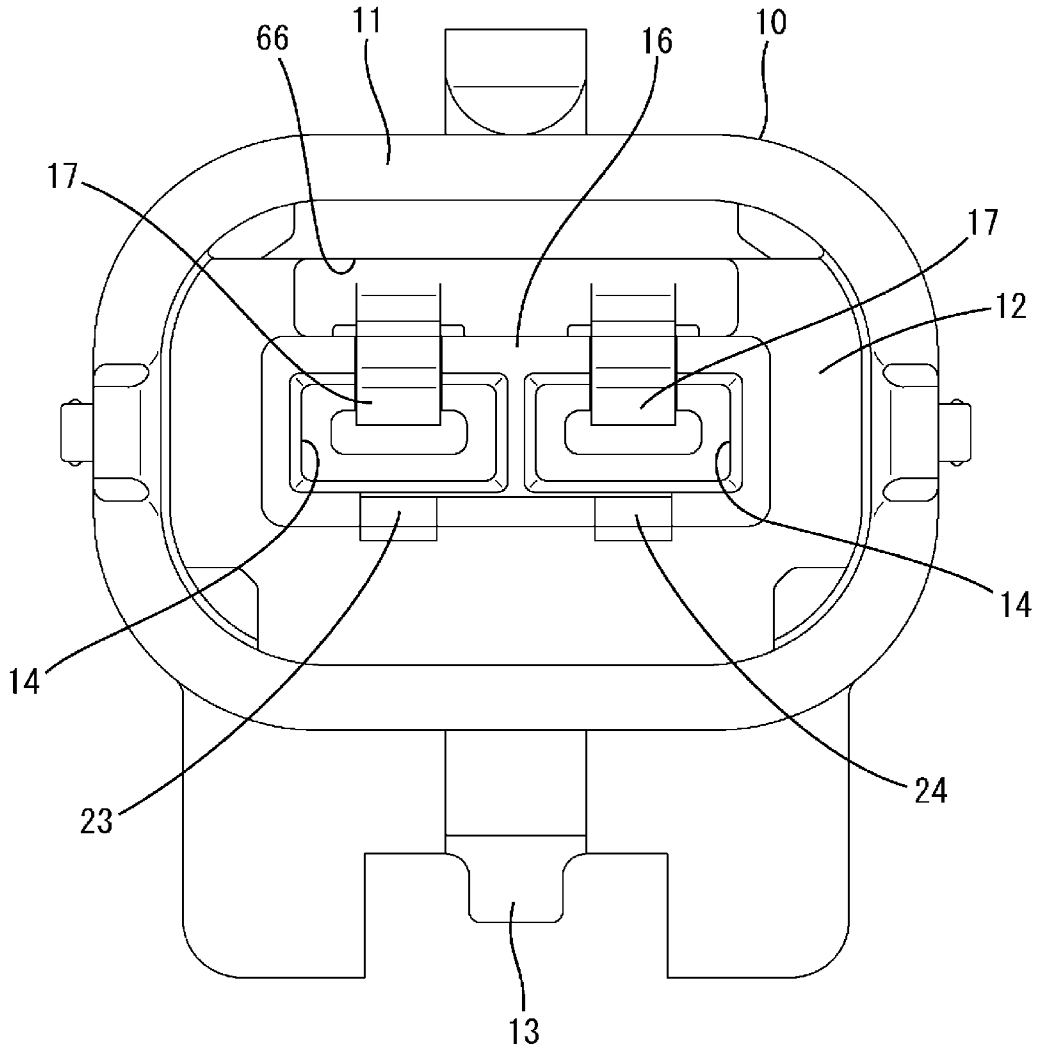
FIG. 6 is a front view of the housing.
Figure 7:
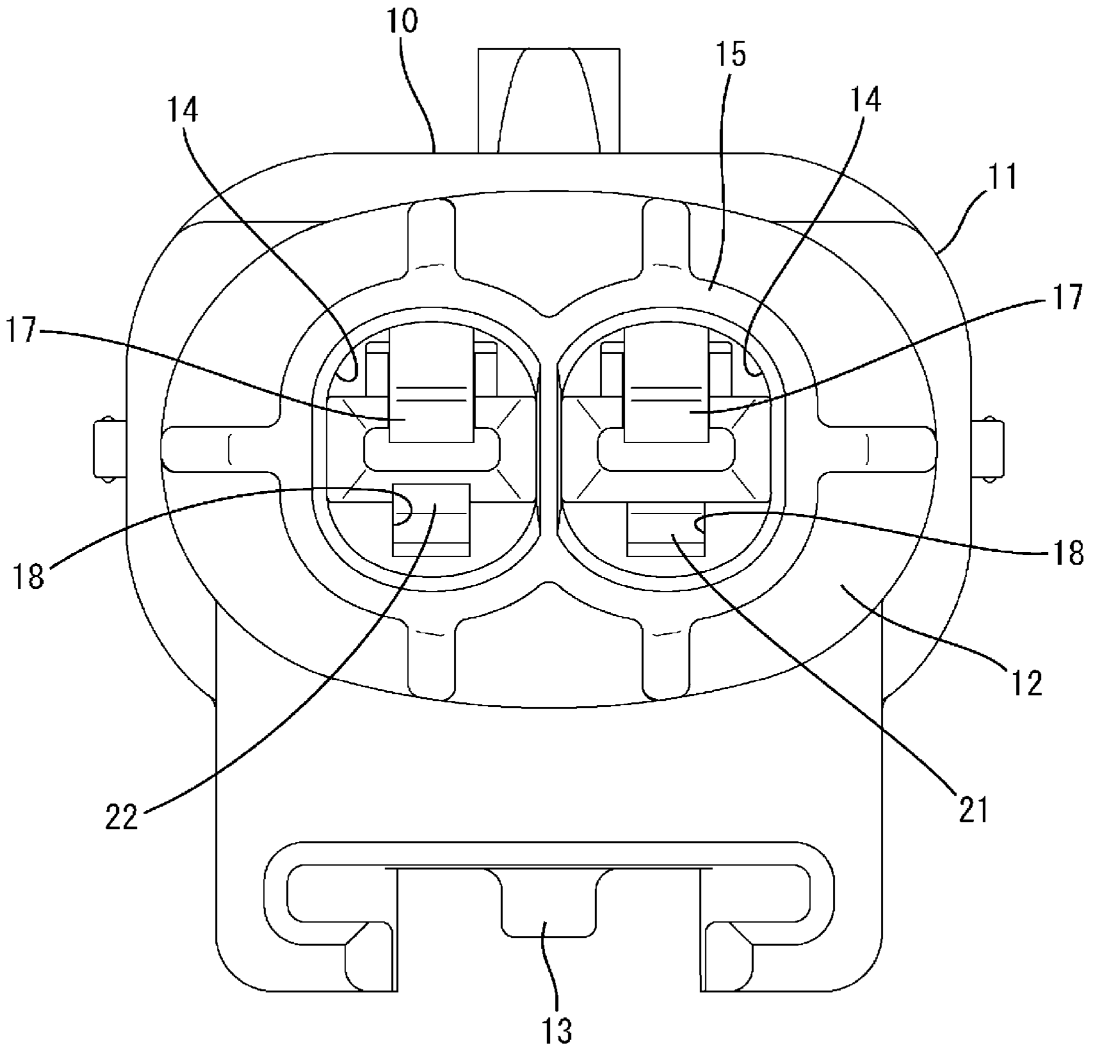
FIG. 7 is a back view of the housing.

The housing 10 is made of synthetic resin and includes, as shown in FIGS. 5 to 7, a housing body 12, the receptacle 11 projecting forward from an outer peripheral part of the housing body 12 and a mounting portion 13 projecting downwardly of the housing body 12 and the receptacle 11. An unillustrated bracket is mounted on the mounting portion 13. The sealing member 95 mounted on the mating housing 90 is held in close contact with the inner peripheral surface of the receptacle 11.

The housing body 12 includes a plurality of cavities 14. A pair of the cavities 14 penetrate in the front-rear direction in the housing body 12 and are arranged side by side in a width direction (lateral direction in FIGS. 6 and 7). The terminal fitting 50 is inserted into each cavity 14 from behind.

As shown in FIGS. 5 and 7, the housing body 12 includes a sealing tower portion 15 projecting rearward in a rear part. Rear parts of the respective cavities 14 are provided side by side in the width direction inside the sealing tower portion 15.

As shown in FIG. 7, the rear part of each cavity 14 has a vertically long oval (including elliptical) cross-sectional shape (opening shape) in the sealing tower portion 15. In the rear part of each cavity 14, a radial dimension in the width direction is smaller than a radial dimension in a vertical direction, thereby avoiding the enlargement of the housing 10 in the width direction.

The radial dimension in the vertical direction of the rear part of each cavity 14 is larger than that of a front part of each cavity 14. As shown in FIG. 1, a rubber plug 55 connected to the terminal fitting 50 is inserted into the rear part of each cavity 14. The rubber plug 55 is held in close contact with the inner peripheral surface of the sealing tower portion 15 and seals the inside of the housing body 12 in a liquid-tight manner.

As shown in FIGS. 5 and 6, the housing body 12 includes a cavity tower portion 16 projecting forward in a front part in the receptacle 11. Front parts of the respective cavities 14 are provided side by side in the width direction inside the cavity tower portion 16. The housing body 12 includes locking lances 17 projecting into the respective cavities 14 on the upper wall of the cavity tower portion 16. As shown in FIG. 1, a front end part of the locking lance 17 in a projecting direction locks the terminal fitting 50 and restricts the terminal fitting 50 from coming out from the cavity 14.

Figure 3:
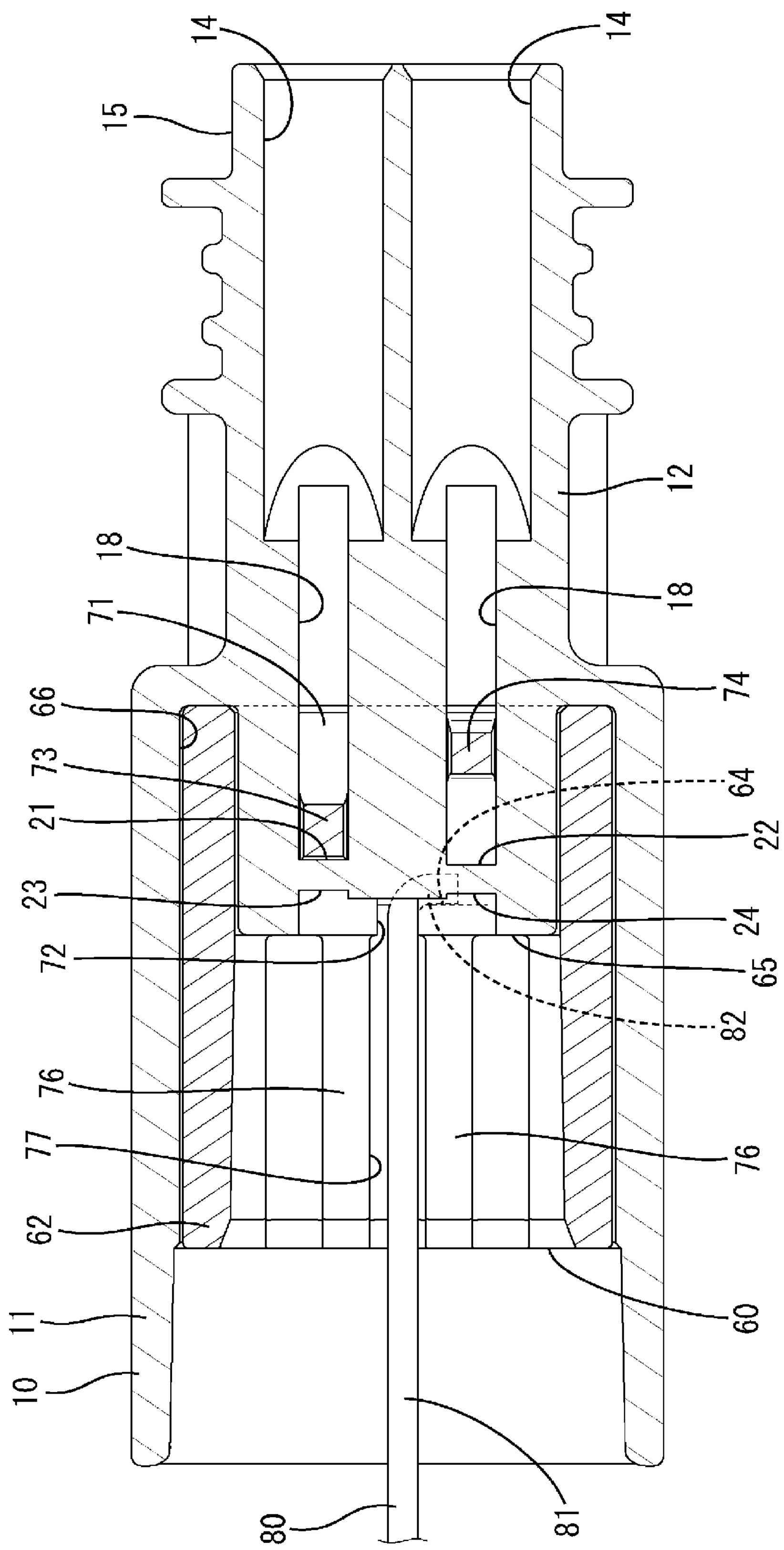
FIG. 3 is a plan view in section in the state of FIG. 2.

The housing body 12 includes a locking groove 18 in the inner lower surface (lower surface of an inner wall) of each cavity 14. As shown in FIGS. 3 and 7, the locking groove 18 extends in the front-rear direction and the rear end thereof is open in the lower surface of the rear part of the cavity 14 in the sealing tower portion 15.

As shown in FIG. 5, a front part of the locking groove 18 penetrates through the lower wall of the cavity tower portion 16 in a thickness direction (vertical direction). The housing body 12 includes a first lock receiving portion 21 and a second lock receiving portion 22 for closing the front ends of the respective locking grooves 18 in the lower wall of the cavity tower portion 16. The first lock receiving portion 21 is provided to correspond to the upper cavity (one cavity 14) of FIG. 3, out of the respective cavities 14. The second lock receiving portion 22 is provided to correspond to the lower cavity (other cavity 14) of FIG. 3, out of the respective cavities 14. The first lock receiving portion 21 is locked by a first locking portion 73 to be described later to restrict a movement of the retainer 60 from the full locking position to the partial locking position (see FIG. 3). The second lock receiving portion 22 is locked by a second locking portion 74 to be described later to restrict a forward removal movement of the retainer 60 from the partial locking position (see FIG. 4).

The first and second lock receiving portions 21, 22 are slopes inclined upward toward a rear side and formed over the entire height in the vertical direction (thickness direction) in the lower wall of the cavity tower portion 16 (see FIG. 5). The first and second lock receiving portions 21, 22 are respectively arranged at the same position in the front-rear direction or at positions proximate in the front-rear direction. As shown in FIG. 7, the first and second lock receiving portions 21, 22 are rectangular in a back view.

The housing body 12 includes a first abutting portion 23 and a second abutting portion 24 in lower parts of opening edges of the respective cavities 14 in the front surface of the cavity tower portion 16. As shown in FIG. 1, the first abutting portion 23 is arranged in front of the first lock receiving portion 21. The second abutting portion 24 is arranged in front of the second lock receiving portion 22. The first locking portion 73 abuts on the first abutting portion 23 to restrict a movement of the retainer 60 from the partial locking position to the full locking position (see FIG. 4). The second abutting portion 24 abuts on the second locking portion 74 to temporarily restrict the arrival of the retainer 60 at the partial locking position.

The first and second abutting portions 23, 24 are slopes inclined downward toward the rear side and formed on back ends recessed from surroundings in the lower part of the front surface of the cavity tower portion 16 (see FIG. 5). The first and second abutting portions 23, 24 are respectively arranged at the same position in the front-rear direction or at positions proximate in the front-rear direction. As shown in FIG. 6, the first and second abutting portions 23, 24 are rectangular in a front view.

Terminal Fittings

The terminal fitting 50 is made of electrically conductive metal and formed into a shape elongated in the front-rear direction by bending a metal plate. As shown in FIG. 1, the terminal fitting 50 is a male terminal and includes a tab portion 51 projecting forward. The tab portion 51 is arranged to project into the receptacle 11. The terminal fitting 50 includes a barrel portion 52 to be crimped and connected to a wire 40 and the rubber plug 55 in a rear part. The terminal fitting 50 includes a tubular body portion 53 between the tab portion 51 and the barrel portion 52. The front end part of the locking lance 17 enters an opening part of the upper wall of the body portion 53 to be locked.

Retainer

Figure 8:
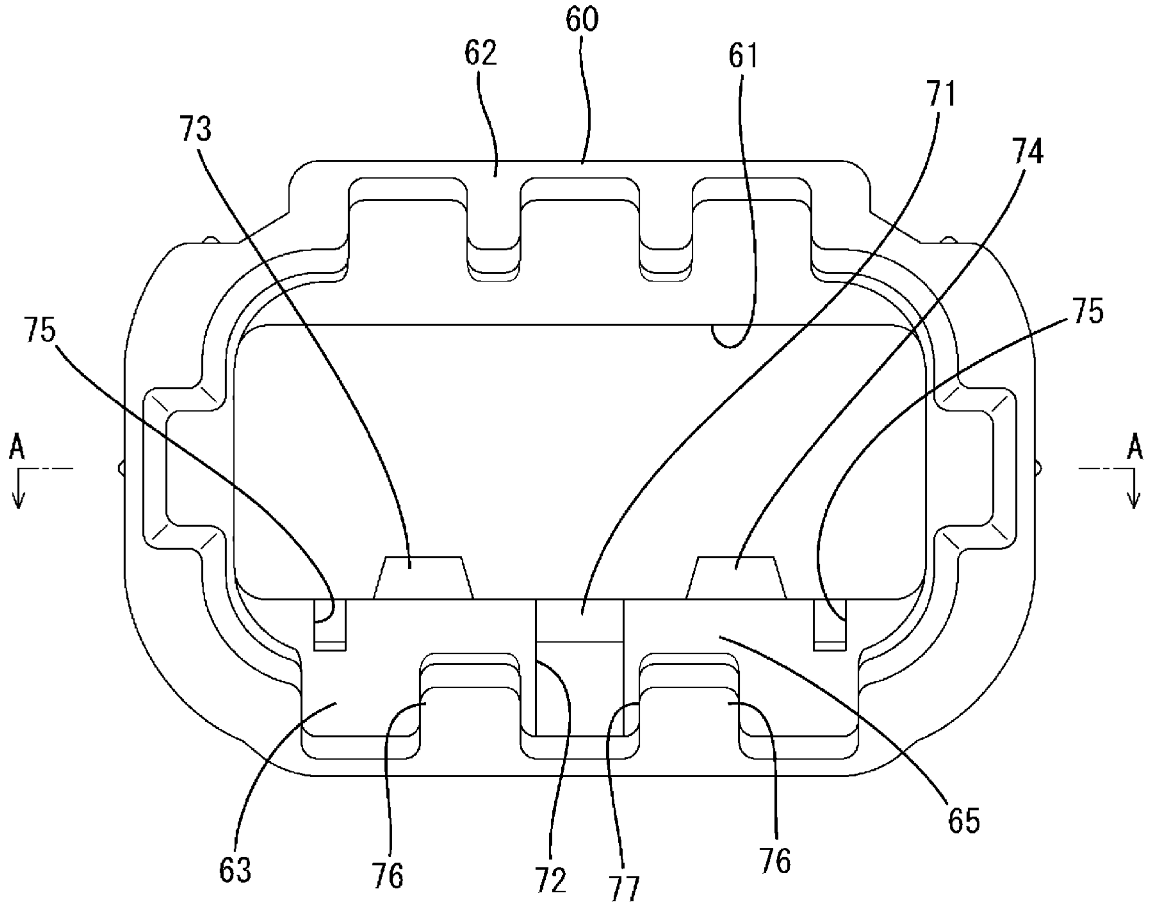
FIG. 8 is a front view of the retainer.
Figure 9:
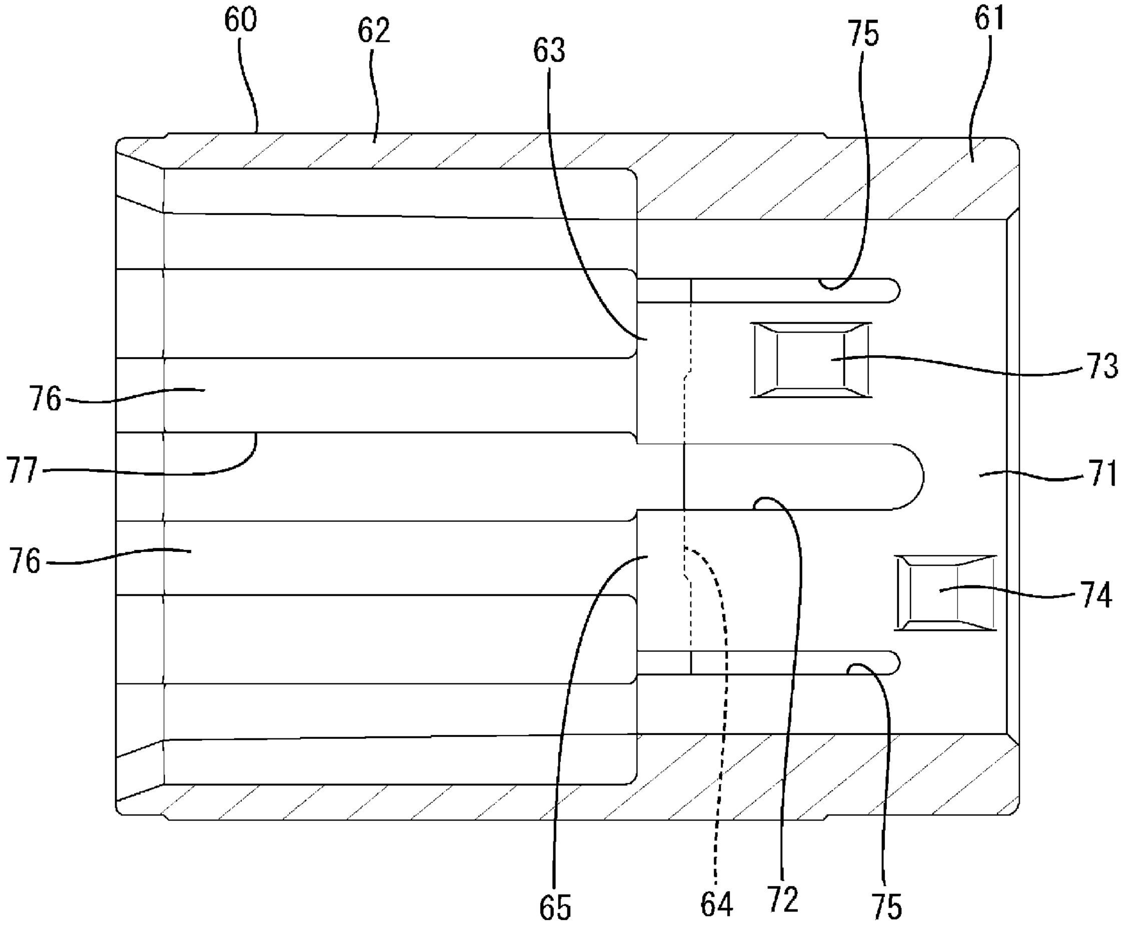
FIG. 9 is a section along A-A of FIG. 8.

The retainer 60 is made of synthetic resin and, as shown in FIGS. 5, 8 and 9, has a tubular shape as a whole and is open in the front-rear direction. The retainer 60 includes an inserting tube portion 61 in a rear part and the fitting tube portion 62 in a front part. A radial dimension in the vertical direction of the fitting tube portion 62 is larger than that of the inserting tube portion 61.

Figure 2:
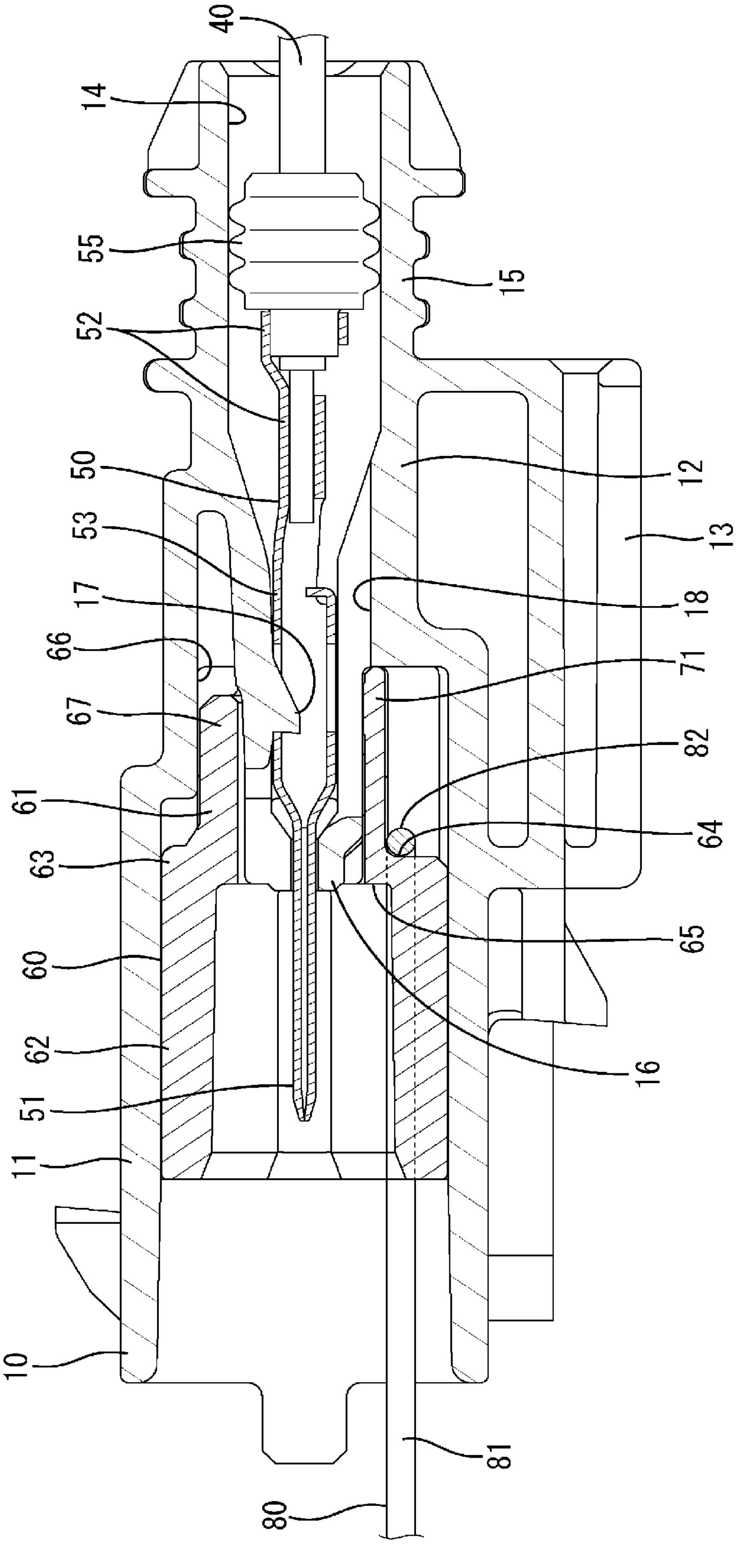
FIG. 2 is a side view in section showing a state where a tip part of a releasing jig is hooked to a facing surface of a step portion.

The retainer 60 includes a step portion 63 along the vertical direction between the front end of the inserting tube portion 61 and the rear end of the fitting tube portion 62. As shown in FIGS. 2 and 9, the rear surface of the step portion 63 serves as a facing surface 64 facing a hooking portion 82 of a releasing jig 80 to be described later in removing the retainer 60, and is arranged flat in the vertical direction and width direction. The front surface of the step portion 63 serves as an opposite surface 65 facing a side opposite to the facing surface 64 and is likewise arranged flat in the vertical direction and width direction.

As shown in FIG. 1, the inserting tube portion 61 is fit and inserted into an insertion space 66 formed between the receptacle 11 and the cavity tower portion 16. The fitting tube portion 62 is fit into the receptacle 11.

The inserting tube portion 61 includes a restricting portion 67 on an upper wall. As shown in FIG. 5, when the retainer 60 is at the partial locking position, the restricting portion 67 is retracted forward of deflection spaces 68 for the locking lances 17 in the insertion space 66 to allow the deflection of the locking lance 17. On the other hand, as shown in FIG. 1, when the retainer 60 is at the full locking position, a rear end part of the restricting portion 67 enters the deflection spaces 68 to restrict the deflection of the locking lances 17.

The lower wall of the inserting tube portion 61 is configured as a deflectable and deformable deflecting piece 71 in the form of a flat plate. As shown in FIG. 5, the deflecting piece 71 is formed thinner than the restricting portion 67. As shown in FIG. 9, the deflecting piece 71 includes a groove-like slit 72 extending in the front-rear direction in a widthwise central part. The slit 72 penetrates through the deflecting piece 71 in a thickness direction (vertical direction). The slit 72 has a semicircular closed rear end in a rear part of the deflecting piece 71.

Further, the slit 72 extends from the deflecting piece 71 to the step portion 63. As shown in FIG. 8, the front end of the slit 72 is open in the opposite surface 65 of the step portion 63. That is, the slit 72 is open forward (separating direction of the retainer 60 from the housing 10) of the retainer 60. The slit 72 forms a vertically long rectangular opening in the opposite surface 65 of the step portion 63. Further, the slit 72 penetrates through a lower part of the step portion 63 in the front-rear direction and is open also in the facing surface 64 of the step portion 63.

As shown in FIG. 9, the deflecting piece 71 includes the first and second locking portions 73, 74 respectively at positions on both widthwise sides across the slit 72. The second locking portion 74 is located behind the first locking portion 73 in a rear end part of the deflecting piece 71. The second locking portion 74 is arranged at a position overlapping the slit 72 in the front-rear direction and has a part to be arranged behind the slit 72. The first locking portion 73 is located in a central part in the front-rear direction of the deflecting piece 71. The first locking portion 73 is arranged at a position entirely overlapping the slit 72 in the front-rear direction. Each of the first and second locking portions 73, 74 is in the form of a block and the front and rear surfaces thereof are formed into slopes. An angle of inclination (angle of inclination with respect to the front-rear direction) of the front surface of the second locking portion 74 is larger than that of the rear surface of the first locking portion 73. An angle of inclination of the rear surface of the second locking portion 74 is larger than that of the rear surface of the first locking portion 73.

As shown in FIG. 9, the deflecting piece 71 includes end slits 75 respectively at positions near the both widthwise ends. In the deflecting piece 71, the respective end slits 75 are arranged at a position opposite to the slit 72 across the first locking portion 73 and at a position opposite to the slit 72 across the second locking portion 74. In other words, the first locking portion 73, the second locking portion 74 and the slit 72 are arranged inwardly of the respective end slits 75 in the width direction in the deflecting piece 71.

Each end slit 75 penetrates through the deflecting piece 71 in the thickness direction (vertical direction). Each end slit 75 has a semicircular closed rear end in the rear part of the deflecting piece 71. Each end slit 75 extends from the deflecting piece 71 to the step portion 63. The front end of each end slit 75 is open in the opposite surface 65 of the step portion 63. As shown in FIG. 8, each end slit 75 forms a vertically long rectangular opening in the opposite surface 65 of the step portion 63. An opening height (depth in the vertical direction) of each end slit 75 in the step portion 63 is smaller than that of the slit 72 in the step portion 63. Further, an opening width of each end slit 75 is smaller than that of the slit 72. The slit 72 and the respective end slits 75 reduce the rigidity of the deflecting piece 71 and allow the deflection of the deflecting piece 71.

As shown in FIGS. 8 and 9, the fitting tube portion 62 includes a pair of wall portions 76 on a bottom part continuous via the deflecting piece 71 and the step portion 63. The respective wall portions 76 are in the form of ribs projecting on both widthwise sides of the upper surface of a bottom wall. The respective wall portions 76 extend in the front-rear direction in parallel to each other, the front ends thereof are facing the opening front surface of the retainer 60 and the rear ends thereof are connected to the step portion 63. A groove 77 formed between the respective wall portions 76 communicates with the slit 72 on the opposite surface 65 of the step portion 63.

Mounting and Removing Methods of Retainer

The retainer 60 is inserted into the receptacle 11 from front. At this time, the fitting tube portion 62 slides on the inner peripheral surface of the receptacle 11, whereby the insertion of the retainer 60 is guided. The inserting tube portion 61 is inserted into the insertion space 66 formed between the cavity tower portion 16 and the receptacle 11 and the deflecting piece 71 is arranged along a lower surface side of the cavity tower portion 16.

Figure 4:
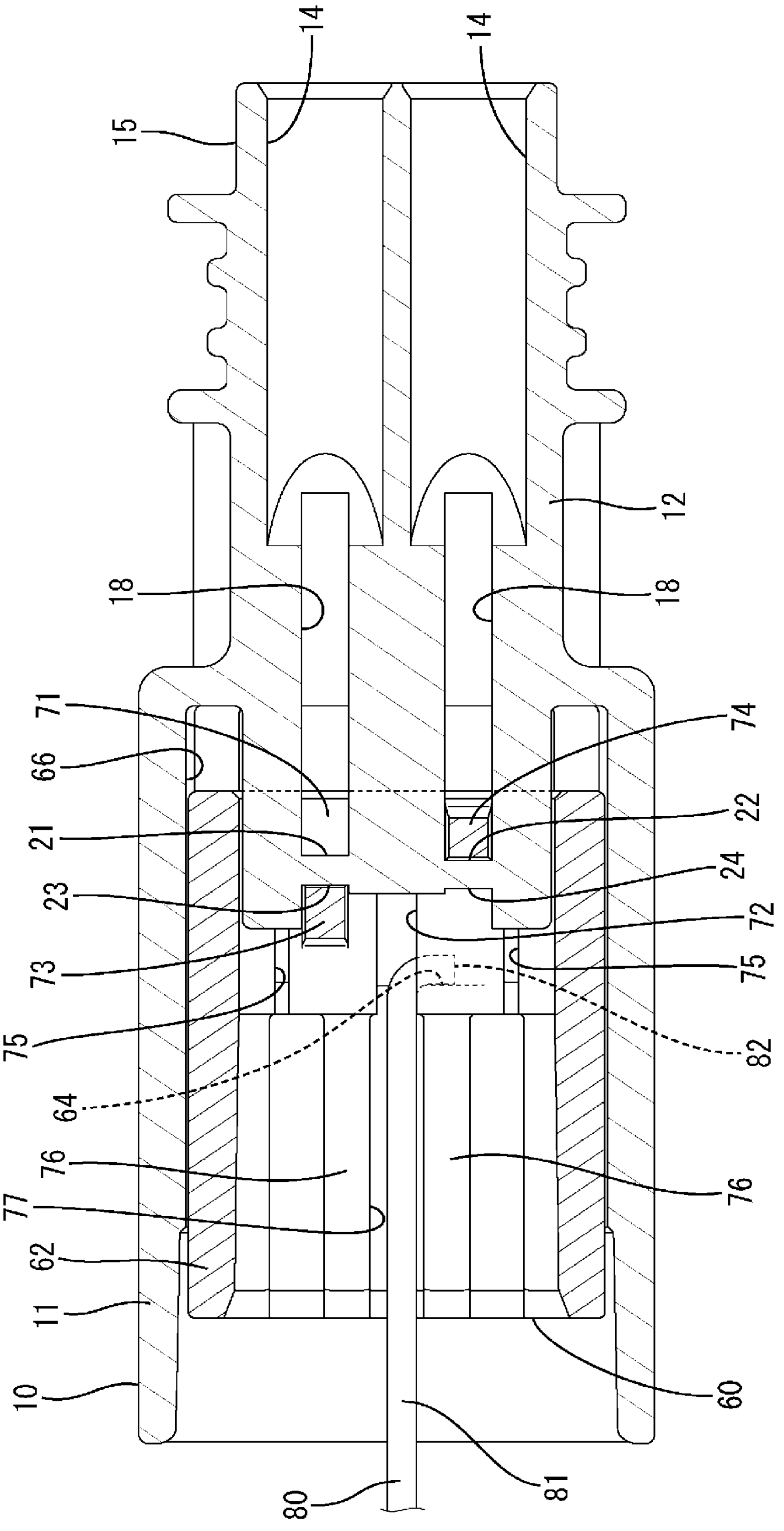
FIG. 4 is a plan view in section showing a state where the tip part of the releasing jig is hooked to the facing surface of the step portion with the retainer held at a partial locking position with respect to the housing.

Immediately before the retainer 60 reaches the partial locking position, the rear surface of the second locking portion 74 slides against the second abutting portion 24 and the deflecting piece 71 is deflected and deformed downward with the side of the step portion 63 as a fulcrum. If the retainer 60 reaches the partial locking position, the deflecting piece 71 resiliently returns and, as shown in FIG. 4, the second locking portion 74 is fit into the lower locking groove 18 of FIG. 4 and arranged to face and be lockable to the second lock receiving portion 22. Further, if the retainer 60 reaches the partial locking position, the first locking portion 73 is arranged to face and be lockable to the first abutting portion 23. In this way, the retainer 60 is arranged at the partial locking position with a movement in the front-rear direction with respect to the housing 10 restricted.

With the retainer 60 located at the partial locking position, the terminal fitting 50 is inserted into each cavity 14 of the housing body 12. If the terminal fitting 50 is properly inserted into the cavity 14, the front end part of the locking lance 17 is hooked and locked to an opening part of the body portion 53. In this way, the terminal fitting 50 is primarily retained and held in the housing 10.

Subsequently, the retainer 60 is moved from the partial locking position to the full locking position. If a pushing force to the full locking position is applied to the retainer 60, the first locking portion 73 slides against the first abutting portion 23, a locked state of the first locking portion 73 and the first abutting portion 23 is released and the deflecting piece 71 is deflected and deformed downward with the side of the step portion 63 as a fulcrum. If the retainer 60 reaches the full locking position, the deflecting piece 71 resiliently returns and, as shown in FIG. 3, the first locking portion 73 is fit into the upper locking groove 18 of FIG. 3 and arranged to face and be lockable to the first lock receiving portion 21. At this time, the second locking portion 74 is arranged away from the second locking portion 22 in the locking groove 18. The first locking portion 73 locks the first lock receiving portion 21, thereby restricting a movement of the retainer 60 to the partial locking position in a return direction.

Further, if the retainer 60 reaches the full locking position, the rear end part of the restricting portion 67 enters the deflection space 68 and the terminal fittings 50 are secondarily retained and held in the housing 10 as shown in FIG. 1. Furthermore, the rear end of the inserting tube portion 61 of the retainer 60 abuts on the back end of the insertion space 66 to restrict a rearward movement of the retainer 60 from the full locking position.

In removing the terminal fitting 50 from the housing 10 according to a situation such as maintenance, the retainer 60 is returned from the full locking position to the partial locking position. At this time, the releasing jig 80 including a jig body 81 shown in FIG. 3 is prepared. The jig body 81 is in the form of a rod elongated in the front-rear direction as a whole. A diameter of the jig body 81 is smaller than an opening width of the groove 77 and that of the slit 72 and larger than the opening width of each end slit 75. A rear end part of the jig body 81 is bent to provide the hooking portion 82.

The jig body 81 is inserted into the groove 77 of the fitting tube portion 62 from front and further inserted into the slit 72 while being guided by the respective wall portions 76. The jig body 81 is turned about an axis with a rear part thereof inserted in the slit 72. In this way, as shown in FIGS. 2 and 3, the hooking portion 82 is arranged to face the facing surface 64 of the step portion 63. In that state, the jig body 81 is moved forward. Then, the hooking portion 82 is hooked and locked to the facing surface 64 of the step portion 63 and a forward separation force acts on the retainer 60. If the jig body 81 is moved further forward, the front surface of the first locking portion 73 slides against the first lock receiving portion 21 and the deflecting piece 71 is deflected and deformed downward with the side of the step portion 63 as a fulcrum. If the first locking portion 73 reaches a front surface side of the cavity tower portion 16, the deflecting piece 71 resiliently returns and the retainer 60 can return to the partial locking position.

By deflecting the locking lance 17 by an unillustrated other terminal withdrawal jig or the like and pulling the wire 40 rearward while pinching the wire 40 with the retainer 60 located at the partial locking position, the terminal fitting 50 can be pulled out from the cavity 14 of the housing 10.

If a forward movement of the jig body 81 is continued, the second locking portion 74 also reaches the front surface side of the cavity tower portion 16 beyond the second lock receiving portion 22 and the retainer 60 can be separated forward from the housing 10.

As described above, according to this embodiment, the slit 72 is arranged between the first and second locking portions 73, 74 in the deflecting piece 71 and open forward (separating direction of the retainer 60 from the housing 10) of the retainer 60. Thus, the jig body 81 of the releasing jig 80 can be inserted into the slit 72 from front of the retainer 60 and a locked state (partially locked state and fully locked state) of the retainer 60 in the housing 10 can be released. Since the slit 72 has a function of making the deflecting piece 71 deflectable and deformable and a function of enabling a releasing operation of the releasing jig 80, the structure of the retainer 60 is not complicated.

Further, since the hooking portion 82 of the releasing jig 80 does not contact the inner peripheral surface of the receptacle 11 and the damage of the inner peripheral surface of the receptacle 11 can be avoided, the sealing member 95 can be satisfactorily held in close contact with the inner peripheral surface of the receptacle 11 and sealability can be maintained.

Further, since the retainer 60 includes the groove 77 continuous with the slit 72 and the groove 77 is arranged between the pair of wall portions 76, the jig body 81 of the releasing jig 80 can be inserted into the groove 77 and the respective wall portions 76 can be used as a guide for guiding the jig body 81. As a result, an inserting operation of the releasing jig 80 can be more easily and efficiently performed.

Further, since the deflecting piece 71 includes the end slits 75 on the both widthwise sides across the first and second locking portions 73, 74 and the opening width of the slit 72 is larger than those of the end slits 75, the strength of the jig body 81 of the releasing jig 80 is easily ensured.

Further, since the retainer 60 includes the step portion 63 at the position adjacent to the deflecting piece 71 and the slit 72 penetrates from the facing surface 64 to the opposite surface 65 of the step portion 63, the locked state of the first locking portion 73 and the first lock receiving portion 21 and the locked state of the second locking portion 74 and the second lock receiving portion 22 can be released by hooking the hooking portion 82 of the jig body 81 to the facing surface 64 of the step portion 63 and moving the jig body 81 forward. Thus, the releasing jig 80 can be prevented from contacting locking structures such as the first locking portion 73, the first lock receiving portion 21, the second locking portion 74 and the second lock receiving portion 22, and the damage of the locking structures can be avoided. It is also possible to avoid the damage of a sealing surface (inner peripheral surface of the receptacle 11 to be held in close contact with the sealing member 95) of the housing 10 by the tip of the releasing jig 80.

Other Embodiments of Present Disclosure

The embodiment disclosed this time should be considered illustrative in all aspects, rather than restrictive.

In the case of the embodiment, the first locking portion and the first lock receiving portion are provided as a full locking structure for restricting a movement of the retainer from the full locking position to the partial locking position and the second locking portion and the second lock receiving portion are provided as a partial locking structure for restricting forward separation of the retainer from the partial locking position. However, as another embodiment, the retainer may not have the partial locking structure and any of the first locking portion, the first lock receiving portion, the second locking portion and the second lock receiving portion may constitute the full locking structure.

Although the rear end of the slit is closed in the rear part of the deflecting piece in the case of the embodiment, the rear end of the slit may be open in the rear end of the deflecting piece as another embodiment.

Although the retainer includes the fitting tube portion to be fit into the receptacle in the case of the embodiment, the retainer may not include the fitting tube portion as another embodiment.

LIST OF REFERENCE NUMERALS

10 . . . housing
11 . . . receptacle
12 . . . housing body
13 . . . mounting portion
14 . . . cavity
15 . . . sealing tower portion
16 . . . cavity tower portion
17 . . . locking lance
18 . . . locking groove
21 . . . first lock receiving portion
22 . . . second lock receiving portion
23 . . . first abutting portion
24 . . . second abutting portion
40 . . . wire
50 . . . terminal fitting
51 . . . tab portion
52 . . . barrel portion
53 . . . body portion
55 . . . rubber plug
60 . . . retainer
61 . . . inserting tube portion
62 . . . fitting tube portion
63 . . . step portion
64 . . . facing surface
65 . . . opposite surface
66 . . . insertion space
67 . . . restricting portion
68 . . . deflection space
71 . . . deflecting piece
72 . . . slit
73 . . . first locking portion
74 . . . second locking portion
75 . . . end slit
76 . . . wall portion
77 . . . groove
80 . . . releasing jig
81 . . . jig body
82 . . . hooking portion
90 . . . mating housing
95 . . . sealing member

What is claimed is:

1. A connector, comprising a housing, terminal fittings and a retainer, wherein:
 the housing includes
  a plurality of cavities,
  a first lock receiving portion arranged to correspond to one cavity and
  a second lock receiving portion arranged to correspond to another cavity,
 the terminal fittings are arranged in the cavities,
 the retainer is arranged in the housing to restrict the terminal fittings from coming out from the cavities and includes a deflecting piece,
 the deflecting piece is configured to deflect and deform in an orthogonal direction with respect to a separating direction of the retainer from the housing and includes
  a slit open in the separating direction so that the deflecting piece can deflect and deform in the orthogonal direction, a first locking portion for locking the first lock receiving portion, the first locking portion being formed on one side of the slit and protruding in the orthogonal direction, and a second locking portion for locking the second lock receiving portion, the second locking portion being formed on an opposite side of the slit and protruding in the orthogonal direction.

2. The connector of claim 1, wherein:

the retainer includes a groove continuous with the slit in the separating direction, and the groove is arranged between a pair of wall portions extending in parallel along the separating direction.

3. The connector of claim 1, wherein the deflecting piece includes end slits on both lateral end parts across the first and second locking portions in a width direction orthogonal to the separating direction, and an opening width of the slit is larger than those of the end slits.

4. The connector of claim 1, wherein the retainer includes a step portion at a position adjacent to the deflecting piece and the slit penetrates from a facing surface on the side of the deflecting piece to an opposite surface of the step portion.

* * * * *